United States Patent [19]

Hopkins et al.

[11] 4,290,500
[45] Sep. 22, 1981

[54] GROUND EFFECT FLYING PLATFORM

[76] Inventors: Harry C. Hopkins, 15 Layfayette St., White Plains, N.Y. 10606; Bernhard H. Goethert, 1703 Sycamore Cir., Manchester, Tenn. 37355; Joseph K. Power, Box 67, Rte. 1, Alpine, Ala. 35014

[21] Appl. No.: 91,178

[22] Filed: Nov. 5, 1979

[51] Int. Cl.³ .................... A01C 23/00; A01M 7/00; B60V 1/16
[52] U.S. Cl. .................................. 180/117; 180/127; 239/159; 239/172
[58] Field of Search ............... 180/127, 129, 122, 121, 180/117; 239/159, 172

[56] References Cited

U.S. PATENT DOCUMENTS

| | | | |
|---|---|---|---|
| 2,876,964 | 3/1959 | Streib | 244/12.2 |
| 2,936,972 | 5/1960 | Zinavage | 244/23 C |
| 3,195,665 | 7/1965 | Beardsley | 180/129 |
| 3,341,125 | 9/1967 | Sweeney et al. | 180/127 |
| 3,429,395 | 2/1969 | Beardsley | 180/127 |
| 3,432,120 | 3/1969 | Guerrero | 244/12.2 |
| 3,525,484 | 8/1970 | Mueller | 244/12.2 |
| 3,662,852 | 5/1972 | Taylor | 180/127 |
| 3,689,011 | 9/1972 | Torelli | 244/12.2 |
| 3,791,478 | 2/1974 | Remon-Beauvais | 180/127 |
| 3,825,094 | 7/1974 | Burdick | 180/121 |
| 4,215,758 | 8/1980 | Jones | 239/159 |

FOREIGN PATENT DOCUMENTS 2408494  7/1979  France ................................. 239/172

OTHER PUBLICATIONS

Cagle, "Flying ships, Hovercraft, and Hydrofoils", Dodd, Mead & Co., 1970, pp. 76–80 and 86–89, (Available in file wrapper).

Primary Examiner—Joseph F. Peters, Jr.
Assistant Examiner—Donn McGiehan
Attorney, Agent, or Firm—Brumbaugh, Graves, Donohue & Raymond

[57] ABSTRACT

A ground-effect vehicle having a base frame and a downwardly extending skirt, rides on an air cushion created by injecting air downwardly through the frame into the space beneath the vehicle. In order to prevent the down draft of the air injected under the vehicle from damaging fragile objects, such as young plants, a deflector is provided to divert the air flow parallel to the ground and to reduce its velocity, while still maintaining sufficient pressure in the air cushion to permit the vehicle to hover.

16 Claims, 5 Drawing Figures

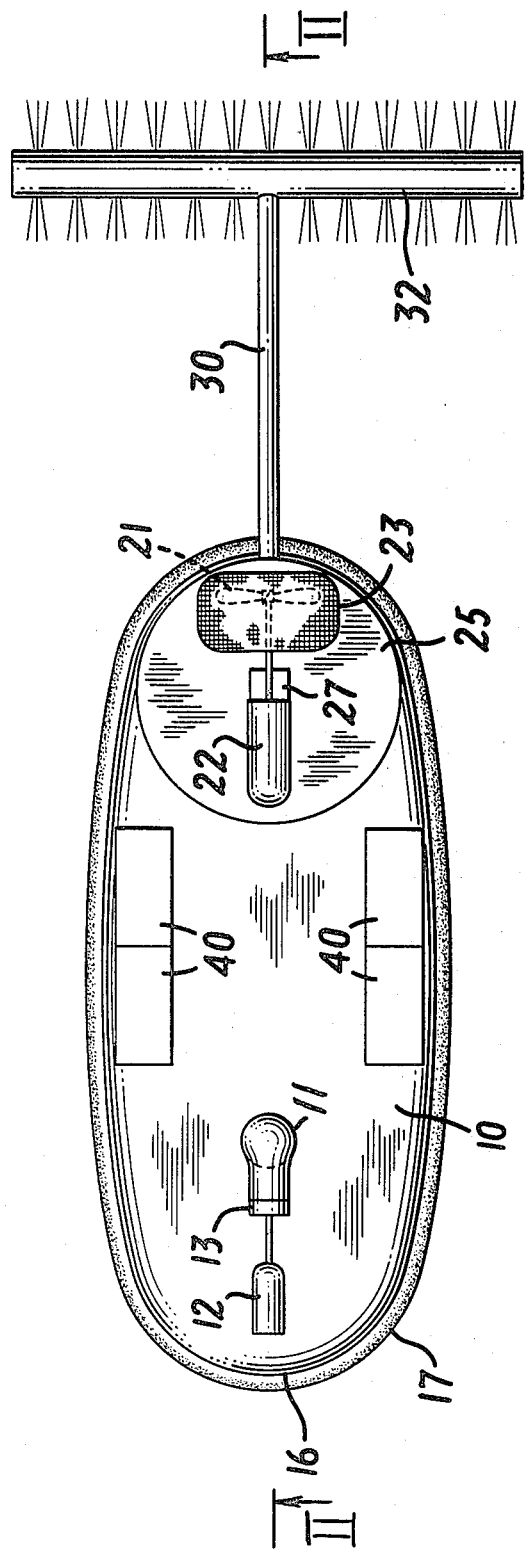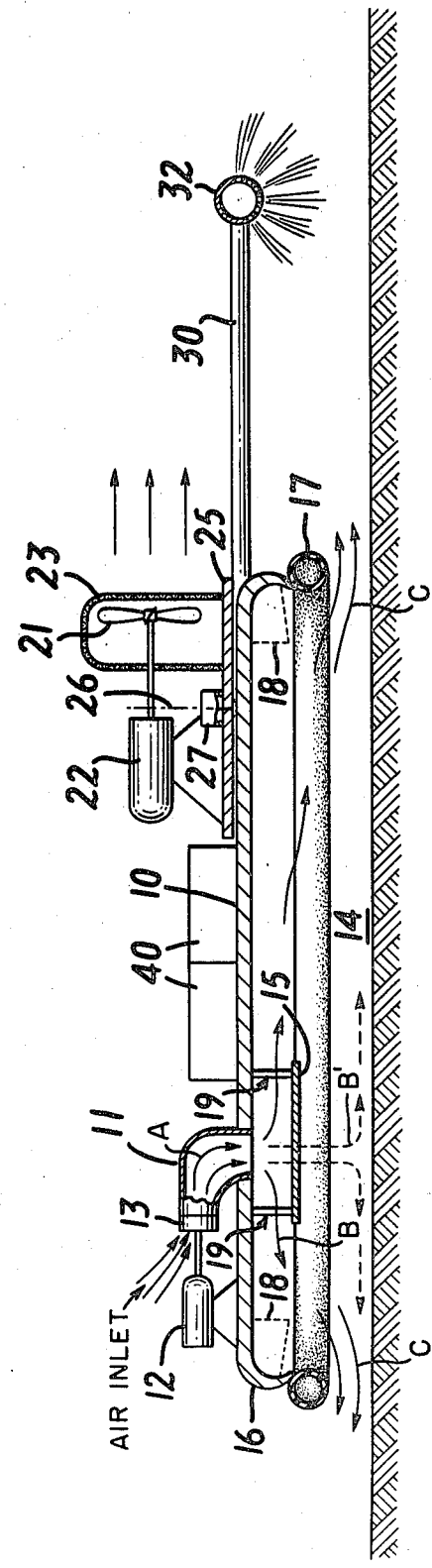

GROUND EFFECT FLYING PLATFORM

BACKGROUND OF THE INVENTION

This invention relates to hovercraft and, more particularly, to ground-effect flying machines.

Hovercraft of various types have been known for a number of years and have been used to accomplish a variety of tasks. Some of these craft are of the helicopter type in which the down draft of rotating blades and the passage of air over the blades themselves, produce a vertical lift. Another type of hovercraft has a circular air foil wing with rotating blades mounted in a central cavity of the wing. The rotating blades draw air over the air foil surface and into the central cavity to produce the vertical lift for the craft. Craft of this type are disclosed in U.S. Pat. No. 2,876,964 to Streib, U.S. Pat. No. 2,936,972 to Zinavage, and U.S. Pat. No. 3,432,120 to Guerrero. In the Guerrero patent, additional lift is is also produced by the "ground-effect" which characterizes another type of vehicle.

Ground-effect vehicles or craft have a propeller or other air source which creates a cushion of air under the body of the craft, upon which it floats. This cushion of air is prevented from being dissipated by a skirt configuration that extends down from the body of the craft to a point close to the ground. Typical of such a vehicle is the cushion craft built by Britten Norman Ltd. of England.

Hovercraft in general can be used for a variety of purposes from toys to the transportation of passengers and cargo. One potentially useful application is in the spraying of crops with seeds, fertilizers, insecticides, etc. While this task can be accomplished by low-flying conventional aircraft, the effects of wind and the inability to accurately control the flight path, cause the spray to be wasted. This spray method may even cause environmental hazards by allowing insecticides to spread into residential areas adjacent the crops. Further, telephone poles and other tall structures makes this activity hazardous to the pilot.

Because of the short-comings and the relatively high cost of spraying by conventional aircraft, a good deal of crop spraying is accomplished by means of wheeled vehicles. This method is quite straightforward and simple; but its application is restricted to periods of time during which the ground is hard enough to carry a wheeled vehicle. Frequently in the Spring rainfall is quite heavy, soaking the ground and making it too muddy to support a vehicle. Thus, the farmer has to wait for favorable weather to dry the ground before he can bring his wheeled vehicle out to do this agricultural work. This waiting period will occasionally cause the farmer to miss the most favorable time for such activities, allowing crop pests to attack the young plants and causing his agricultural work to be out of phase with the most favorable seasonal weather conditions. Thus it can be seen that a tremendous loss of agricultural productivity to the country and loss of income to the farmers can occur, particularly to small farmers with limited resources.

It has been proposed to overcome this problem by carrying out such activities as seeding, crop dusting, spraying, etc., by means of hovercraft, such as helicopters. These vehicles operate at a distance above the ground so that they can be used without regard to the condition of the ground, i.e. whether or not it is muddy. Helicopters, however, are expensive to operate and still present a hazard to the pilot when used close to the ground. As an alternative the Gunderson Agricultural ACV, which is a manned, ground-effect machine, has been proposed for experimental crop spraying. See Cagle, *Flying Ships, Hovercraft and Hydrofoils,* Dodd Mead & Co. (1970). However, the principal problem with the use of either of these types of hovercraft for agricultural purposes is that they create a large down draft that can destroy young plants.

SUMMARY OF THE INVENTION

The present invention is directed to providing a ground-effect hovercraft that can carry out a variety of tasks, including the agricultural spraying of young plants, in which the problem created by a large down draft is overcome by channeling the exhaust air parallel to the ground.

In an illustrative embodiment of the invention the vehicle is provided with a base frame or platform from which a fixed skirt extends toward the ground. Attached to the lower edge of the fixed skirt is a flexible skirt. A propeller or other air source, e.g. a compressor, is located on the base and produces a large air flow downward through the base and into the area below the base enclosed by the skirts. A deflector plate located below the base at the inlet for the air flow, reduces the speed of the air and deflects it parallel to the ground. A pressure buildup under the base due to the influx of air causes the vehicle to rise off the ground. At this point the air flows out under the skirt parallel to the ground. Since, the base has a relatively large circumference, this air flow is relatively slow compared to the velocity of the air from the air source which enters the area below the base. By means of a proper configuration of the skirts, additional lift is created as the air flows under the edge of the skirt.

Lateral movement of the vehicle is produced by a rotatably mounted propeller which may be remotely controlled. Also spray or seeding equipment is arranged to extend from the base.

In a preferred embodiment, perforated deflector plates are arranged near the skirts to further slow the air speed and to build up the pressure of the air cushion beneath the vehicle.

BRIEF DESCRIPTION OF THE DRAWINGS

The foregoing and other features of the present invention will be more readily apparent from the following detailed description and drawings of illustrative embodiments of the invention in which:

FIG. 1 is a schematic top view of a ground-effect hovercraft according to the present invention, FIG. 2 is a schematic side sectional view along line II—II of FIG. 1 showing the hovercraft according to the present invention.

DESCRIPTION OF EXEMPLARY EMBODIMENTS

Figure 3:
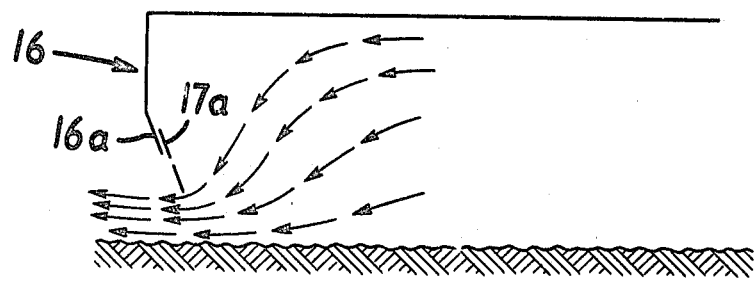
FIGS. 3-5 are schematic side sectional views of alternative embodiments of the skirt areas of the hovercraft according to the present invention.

The principle of operation of air cushion or ground-effect vehicles is well known. It involves creating a pressurized air space or cushion beneath the vehicle. The cushion is typically produced by a fan driven by any convenient type of engine. When the pressure of the cushion acting on the underside of the vehicle exceeds the weight of the vehicle, it will rise vertically. Then the excess air from the cushion escapes around the circumference of the vehicle, since no other outlet is provided. In connection with crop dusting and other agricultural activities, it is important to make sure that the air of the cushion does not move about enough to damage young crops. This purpose is accomplished with the vehicle of FIGS. 1 and 2.

In the drawings of FIGS. 1 and 2 a ground-effect hovercraft is shown with a platform or base frame 10 on which is mounted an engine 12. Engine 12 drives a fan or compressor 13 such that ambient air is drawn into a duct 11, where it is directed downward along air flow path A through the base and into an area or space 14 located below the base. The circumference of area 14 is bounded by a fixed skirt 16, which has a flexible skirt 17 attached to its lower edge. Skirt 17 is made of a flexible material, e.g. rubber, so that there will be no damage to the craft if it hits a ground obstacle. Also, the flexibility of skirt 17 allows it to flex to allow air to escape from the area 14 by traveling under the edge of skirt 17 along air flow path C.

In prior ground-effect craft the air leaving duct 11 follows air flow path B' and strikes the ground with sufficient force to injure the young plants. However, this flow of air is necessary in order to cause the pressure in the space 14 to build up until it is sufficient to lift the weight of the craft. Once the craft has lifted off the ground, the air passes under the edge of the skirt. According to the present invention the air flow path is modified so that it travels parallel to the ground until its velocity has been greatly reduced by being spread out over the circumference of the craft. This modified flow path B is accomplished by means of deflector plate 15. Plate 15 may be solid and impervious to the air flow or it may be perforated so that the downward air flow is not completely stopped, but is greatly reduced. As a result, the concentrated blast of air from duct 11, which in previous craft is directed down on young plants, is now directly parallel to the ground and is spread out over an annular gap 19. The air speed is reduced even more when it is spread out over the annular gap between the edge of the skirt and the ground. These gaps are of sufficient area to reduce the air velocity to tolerable values where it approaches the ground along air flow path C. Since the vertical lift of the vehicle is dependent on the air pressure/weight ratio and not directly on the air flow path, the modification in the flow path due to deflector plate 15 does not adversely effect the capability of the craft.

Lateral motion of the craft can be by any convenient means. As an example, part of the air cushion can be allowed to pass through slots in the skirt to create lateral movement. However, the simplest means of producing lateral control of the craft is via an auxiliary propulsion system, such as auxiliary fan 21, which is driven by an auxiliary motor 22. Although not necessary, the safety of the craft can be improved by locating fan 21 within a protective shroud 23. The auxiliary motor-fan combination is mounted on a rotatable plate 25 so that they can be pivoted about a vertical axis 26. Thus, the craft can be directed in any direction. Advantageously, the rotation of plate 25 is by means of a remotely controlled motor 27 which allows the craft to be unmanned.

Extending from any convenient location on the base 10 is a boom 30 which supports spray tube 32 or some other agricultural impliment. The supplies for the spray equipment can be located in compartments 40 located on the platform 10.

In FIG. 3 there is shown the fixed skirt 16 and a flexible skirt 17a in the form of an annular flap. As also shown in FIG. 2, the fixed part of the skirt has an inwardly curved portion 16a. A suitable design for this curved portion 16a and the flexible skirt 17a will provide additional lift for the vehicle due to the air flow along the skirt.

Figure 4:
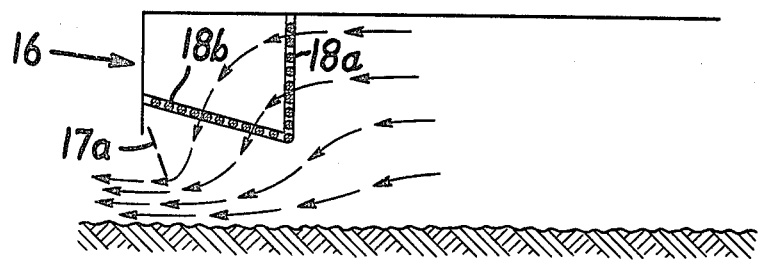
Figure 5:
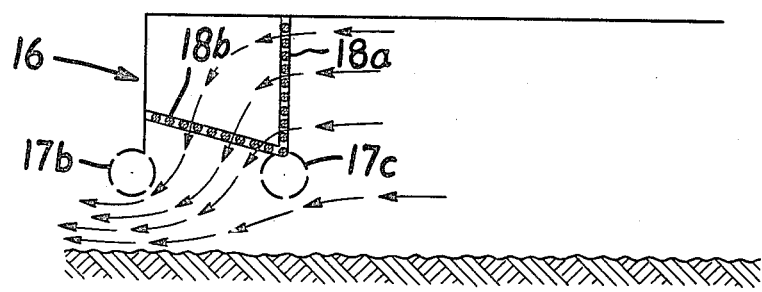

Although the deflector plate 15 assures that the young plants under the exhaust duct 11 are not damaged, there may still be plant damage if the air flow C under the skirt is large enough to knock the plants over. There are a number of trade-offs that can be made to guard against this. The velocity of the air flow C is proportional to the pressure difference between the air cushion and the ambient air. Therefore, if this difference is reduced, the velocity will be lower. However, reducing the pressure difference will require that either the weight of the vehicle be reduced or that its size be increased at no increase in weight. Another technique is also available for limiting the velocity of the air flow C and it is shown in FIGS. 4 and 5. In those drawings perforated plates 18 are provided adjacent the skirts. The flexible skirt 17a of FIG. 4 is in the form of a flap, while the flexible skirt 17b of FIG. 5 is tubular in shape. In addition a second flexible skirt 17c is provided at the intersection of the perforated plates in FIG. 5. As can be seen by comparing the flow paths in FIGS. 4 and 5, the second skirt 17c causes more of the air to flow through annular perforated plates 18, i.e. plates 18a, 18b. This means that more of the air is at the lower velocity. Skirt 17c also provides protection for plates 18 when the vehicle settles on the ground. Both of these arrangements cause the air to lose part of its total pressure as it passes through the perforated plates, thus reducing its velocity. In effect an intermediate pressure zone is created by the perforated plates, which zone allows the air leaving that zone to be at a lower velocity. The high pressure zone that supports the craft is contained in the area defined by plate 18a, the intermediate zone is between plates 18a and 18b, and a low pressure zone is between plate 18b and skirt section 17. The low pressure zone extends to a certain extent under the high pressure zone in FIG. 4, but this is greatly reduced in FIG. 5 by the skirt 17c.

In order to check the operating parameters of a vehicle according to the present invention, one was designed with a projected area of 8×20 ft. (i.e. 14.86 sq. meters), a weight of 1000 kg, and an unobstructed ground clearance of 0.2 meters. The low design weight is made possible by designing the craft from laminated plastic material. The circumferential length of the gap under the skirt is approximately 17 meters and its area is 3.47 sq. meters. Such a vehicle requires an air cushion with a pressure $\Delta p = W/Av$ of 67.3 kg/sq. meter, which would result in a mean discharge velocity, $v = \sqrt{\Delta p \frac{1}{2}\rho}$, for the air flow under the skirt of 32.8 meters per second. However, the deflector plate 15 and other structural members, e.g. plates 18, can contribute an obstruction factor that reduces this flow to 16.4 meters per second, a value considered tolerable for a variety of young plants. The volume of air flow through the gap between the skirt and the ground is equal to the gap times the velocity, or 114 cubic meters/sec., with ideal unobstructed conditions. With a 50% obstruction factor it is reduced to 57 cubic meters/sec. The engine power required for the fan or propeller drive, i.e. $P_F = 1/\eta$ Vol Δp, is 144 HP or 107 KW for the ideal unobstructed gap. For an obstruction factor of 50%, 72 HP or 54 KW is required.

These figures can be modified depending upon the vehicle design requirement. As an example, if the weight of the vehicle is increased from 1,000 Kg to 4,000 Kg at the same pressure, the linear dimensions of the vehicle have to be increased by a factor of 2. The weight increase from 1,000 to 4,000 Kg, however, would not increase the air velocity at all, but, the required engine power would go up by a factor of 2. Conversely, if the size of the vehicle remains the same and there is an increase in the pressure, there will be an increase in the velocity of the air under the skirt and an increase in the weight lifting capacity. Increasing the pressure by a factor of 4 and the velocity by a factor of 2 results in a total power requirement increase by a factor of 8. Thus, the machine can be designed so that the discharge velocity of the air is as low as possible, by effectively increasing the gap with devices such as the perforated screens, or by adjusting its size and weight.

The craft as described and illustrated is principally designed for agricultural purposes. However, it can be used for any other task suitable for a hover-craft. In particular it can be used (1) over water as a mine or submarine detector, (2) as a communications platform, (3) to transport passengers and cargo, (4) as a toy, (5) to fight fires by spreading flame retardant chemicals, (6) for security purposes in the form of patrols or to relay alarm messages, etc.

While the invention has been particularly shown and described with reference to preferred embodiments thereof, it will be understood by those skilled in the art that various changes in form and details may be made therein without departing from the spirit and scope of the invention.

We claim:

1. A ground-effect vehicle capable of hovering above the ground comprising:

a base frame;

a skirt extending downwardly from the periphery of the base frame;

air source means located on the base frame for injecting an air flow with a particular velocity downwardly through an aperture in the base frame to create an air cushion of high pressure air in a pressure space bounded by the base frame, the skirt and the ground, said air pressure being sufficient to lift the vehicle and to allow the air to escape under said skirt; and deflector means for diverting the downward air flow into an air flow parallel to the ground and reducing the velocity of said air flow as it passes under the skirt, said deflector means including first, second and third plates, said first plate being located in a plane substantially parallel to the ground when the vehicle is in level flight and being at the horizontal position of the aperture in the base frame, but vertically spaced therefrom, so as to form a horizontal discharge gap, said first plate having a circumference sufficent to give the discharge gap an area large enough to significantly reduce the velocity of the air flow, said second and third deflector plates being positioned along the circumference of the skirt generally parallel to and perpendicular to the skirt, respectively, the second and third deflector plates being joined at one end, the second and third deflector plates also being perforated and positioned to intercept the parallel air flow, the second and third reflector plates forming an intermediate pressure area within said pressure space so as to reduce the velocity of the air flow as it escapes under the skirt.

2. A ground-effect vehicle as claimed in claim 1 wherein said skirt has a fixed portion and a flexible portion extending from the lower edge thereof.

3. A ground-effect vehicle as claimed in claim 2 wherein the flexible skirt portion is in the form of an annular flap.

4. A ground-effect vehicle as claimed in claim 2 wherein the flexible skirt portion is in the form of an annular tubular member.

5. A ground-effect vehicle as claimed in claim 1 wherein said air source means comprises an air flow generator mounted on the base frame and a duct connecting the output of the air flow generator to the aperture through the base frame to the pressure space.

6. A ground-effect vehicle as claimed in claim 5 wherein the air source means is a propeller driven by an engine.

7. A ground-effect vehicle as claimed in claim 5 wherein the air source means is an air compressor driven by an engine.

8. A ground-effect vehicle as claimed in claim 1 further including a second flexible skirt connected along the junction of the second and third deflector plates.

9. A ground-effect vehicle as claimed in claim 1 further including drive means for providing lateral propulsion of the vehicle.

10. A ground-effect vehicle as claimed in claim 9 wherein the drive means comprises an auxiliary motor and an auxiliary propeller that creates a horizontal air flow upon being driven by the auxiliary motor, the auxiliary propeller being pivotable about a vertical axis in order to steer said vehicle in any horizontal direction.

11. A ground-effect vehicle as claimed in claim 9 wherein said air source means and said drive means are remotely controlled.

12. A ground-effect vehicle as claimed in claim 1 further including a boom extending from said frame, said boom supporting an agricultural implement.

13. A ground-effect vehicle as claimed in claim 1 further including storage compartments located on the base frame.

14. A ground-effect vehicle as claimed in claim 2 wherein said fixed skirt portion is curved inwardly and is designed to provide additional lift for the vehicle.

15. A ground-effect vehicle as claimed in claim 1 wherein the circumference of the base frame and the amplitude of the air pressure is such that the air flow under the edge of the skirt is substantially parallel to the ground and its velocity does not exceed 35 meters/sec.

16. A ground-effect vehicle as claimed in claim 15 wherein the velocity does not exceed 17 meters/sec.

* * * * *

UNITED STATES PATENT AND TRADEMARK OFFICE
CERTIFICATE OF CORRECTION

PATENT NO. : 4,290,500
DATED : September 22, 1981
INVENTOR(S) : Hopkins et al.

It is certified that error appears in the above—identified patent and that said Letters Patent is hereby corrected as shown below:

Col. 1, line 19, "is is" should read --is--.

Col. 3, line 50, "effect" should read --affect--.

Col. 3, line 68, "impliment" should read --implement--.

Col. 4, lines 49-50, "(i.e. 14.86 sq.) meters)" should read --(i.e., 14.86 sq. meters)--.

Col. 4, line 57, "$\sqrt{\Delta p} \ 1/2p$" should read --$\sqrt{\Delta p \ 1/2p}$--.

Col. 6, line 7, "reflector" should read --deflector--.

Signed and Sealed this

Twenty-second Day of December 1981

[SEAL]

Attest:

Attesting Officer

GERALD J. MOSSINGHOFF
*Commissioner of Patents and Trademarks*